US009759114B2

(12) United States Patent
Schwartz et al.

(10) Patent No.: US 9,759,114 B2
(45) Date of Patent: Sep. 12, 2017

(54) SELECTIVE POWERTRAIN HEATING SYSTEM

(71) Applicant: FORD GLOBAL TECHNOLOGIES, LLC, Dearborn, MI (US)

(72) Inventors: William Samuel Schwartz, Pleasant Ridge, MI (US); David Richens Brigham, Ann Arbor, MI (US); Mark John Jennings, Saline, MI (US); Quazi Hussain, Holland, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 552 days.

(21) Appl. No.: 14/306,345

(22) Filed: Jun. 17, 2014

(65) Prior Publication Data

US 2015/0360541 A1 Dec. 17, 2015

(51) Int. Cl.
| | |
|---|---|
| *F01N 5/02* | (2006.01) |
| *B60H 1/00* | (2006.01) |
| *F01M 5/00* | (2006.01) |
| *B60H 1/20* | (2006.01) |
| *B60W 50/00* | (2006.01) |

(52) U.S. Cl.
CPC ........... *F01N 5/02* (2013.01); *B60H 1/00764* (2013.01); *B60H 1/00885* (2013.01); *F01M 5/001* (2013.01); *F01M 5/005* (2013.01); *F01M 5/007* (2013.01); *B60H 1/20* (2013.01); *B60W 2050/0026* (2013.01)

(58) Field of Classification Search
CPC ........ F01M 5/005; F01M 5/001; F01M 5/007; F01M 2250/60; F01N 5/02; B60W 2050/0026
See application file for complete search history.

(56) References Cited

U.S. PATENT DOCUMENTS

| | | | | |
|---|---|---|---|---|
| 4,601,328 A | * | 7/1986 | Tasaka | G05D 23/1919 165/101 |
| 4,920,759 A | | 5/1990 | Tanaka et al. | |
| 5,285,963 A | * | 2/1994 | Wakefield | B60H 1/0025 123/142.5 R |
| 5,832,990 A | | 11/1998 | Eisenhour | |
| 6,118,099 A | | 9/2000 | Lake et al. | |
| 6,427,640 B1 | * | 8/2002 | Hickey | F01M 5/007 123/41.31 |
| 6,901,788 B2 | * | 6/2005 | Han | F01M 11/10 73/114.55 |
| 7,073,467 B2 | | 7/2006 | Kanno et al. | |
| 7,665,513 B2 | * | 2/2010 | Sasaki | F01P 11/08 123/196 AB |
| 8,205,709 B2 | | 6/2012 | Gooden et al. | |

(Continued)

FOREIGN PATENT DOCUMENTS

JP 2014227038 A * 12/2014

*Primary Examiner* — Devon Russell
(74) *Attorney, Agent, or Firm* — David Kelley; Brooks Kushman, P.C.

(57) ABSTRACT

A vehicle includes a powertrain having an engine and at least one controller. The controller is programmed to selectively heat at least one of a plurality of components of the powertrain with a given amount of waste heat based on an expected decrease in friction power associated with an expected increase in temperature from the given amount of waste heat for each of the components.

12 Claims, 5 Drawing Sheets

(56) References Cited

U.S. PATENT DOCUMENTS

| | | | |
|---|---|---|---|
| 8,333,068 B2 * | 12/2012 | Muramatsu | F01N 3/0205 60/320 |
| 8,362,398 B2 | 1/2013 | Heiden et al. | |
| 8,413,434 B2 * | 4/2013 | Prior | F01M 5/001 165/266 |
| 8,463,495 B2 * | 6/2013 | Spohn | F01M 5/001 123/41.31 |
| 8,485,932 B2 * | 7/2013 | Beechie | F01N 5/02 475/161 |
| 9,416,696 B2 * | 8/2016 | Cattani | F01M 5/005 |
| 2007/0137594 A1 * | 6/2007 | Boudard | B60H 1/00314 123/41.57 |
| 2009/0101312 A1 | 4/2009 | Gooden et al. | |
| 2010/0187211 A1 | 7/2010 | Eisenhour et al. | |
| 2011/0284200 A1 | 11/2011 | Gooden et al. | |
| 2012/0085511 A1 | 4/2012 | Park et al. | |
| 2012/0312498 A1 * | 12/2012 | Kim | F01P 7/165 165/41 |
| 2013/0092349 A1 * | 4/2013 | Curtis | F16H 57/0413 165/51 |
| 2013/0180478 A1 * | 7/2013 | Ceynow | F01M 5/005 123/41.08 |
| 2013/0255599 A1 | 10/2013 | Jentz et al. | |
| 2013/0255603 A1 | 10/2013 | Pursifull et al. | |
| 2013/0255604 A1 | 10/2013 | Rollinger et al. | |
| 2013/0255605 A1 | 10/2013 | Jentz et al. | |
| 2015/0040875 A1 * | 2/2015 | Han | F01M 5/001 123/568.12 |

\* cited by examiner

SELECTIVE POWERTRAIN HEATING SYSTEM

TECHNICAL FIELD

The present disclosure relates to heating systems for selective heating of powertrain components.

BACKGROUND

Motor vehicles include various powertrain components, such as an engine and a transmission, for propelling the vehicle during operation. The powertrain components have an optimal operating temperature range in which the components operate efficiently. Typically, upon initial startup of the vehicle, the powertrain components are cold and have a temperature below the optimal range. The cold powertrain components have increased losses as compared to warm powertrain components. The powertrain components increase in temperature during operation of the vehicle. However, depending on ambient temperature conditions, the powertrain can remain cold for at least several minutes. Fuel efficiency of the vehicle during this warm-up period is reduced compared to normal diving conditions.

SUMMARY

In one embodiment, a vehicle includes a powertrain having an engine and at least one controller. The controller is programed to, in response to a start of the engine, selectively heat at least one of a plurality of components of the powertrain with a given amount of waste heat exhausted by the engine based on an expected decrease in friction power associated with an expected increase in temperature from the given amount of waste heat for each of the components.

In another embodiment, a method of controlling a selective heating system includes selectively heating at least one of a plurality of components of a vehicle powertrain with a given amount of waste heat based on an expected decrease in friction power associated with heating each of the components with the given amount of waste heat.

In yet another embodiment, a vehicle includes a powertrain having an engine and at least one controller. The controller is programed to selectively heat at least one of a plurality of components of the powertrain with a given amount of thermal energy based on an expected decrease in friction power associated with an expected increase in temperature from the given amount of thermal energy for each of the components.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
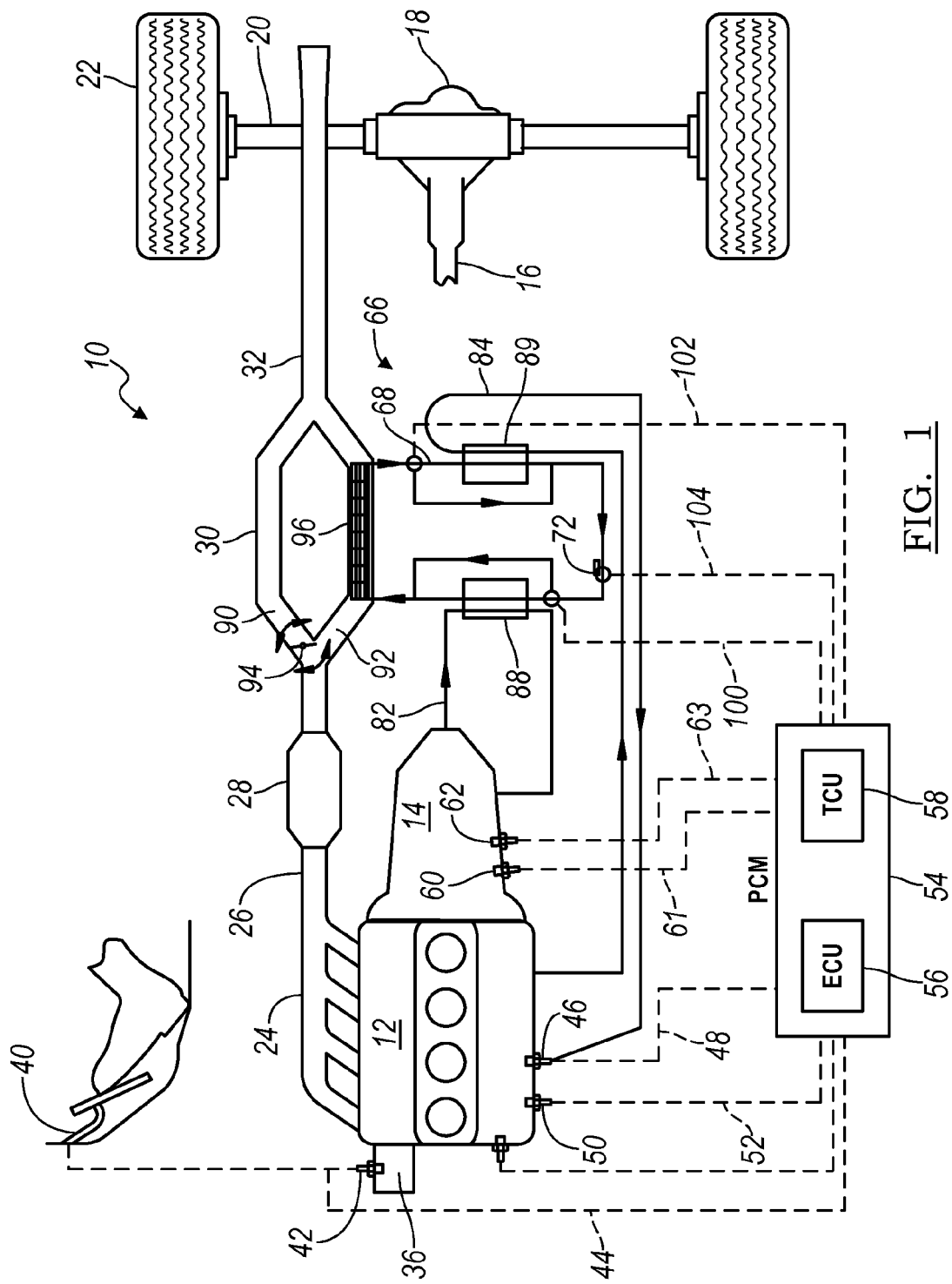
FIG. 1 illustrates a schematic diagram of a vehicle system for controlling selective heating of a vehicle powertrain.
Figure 2:
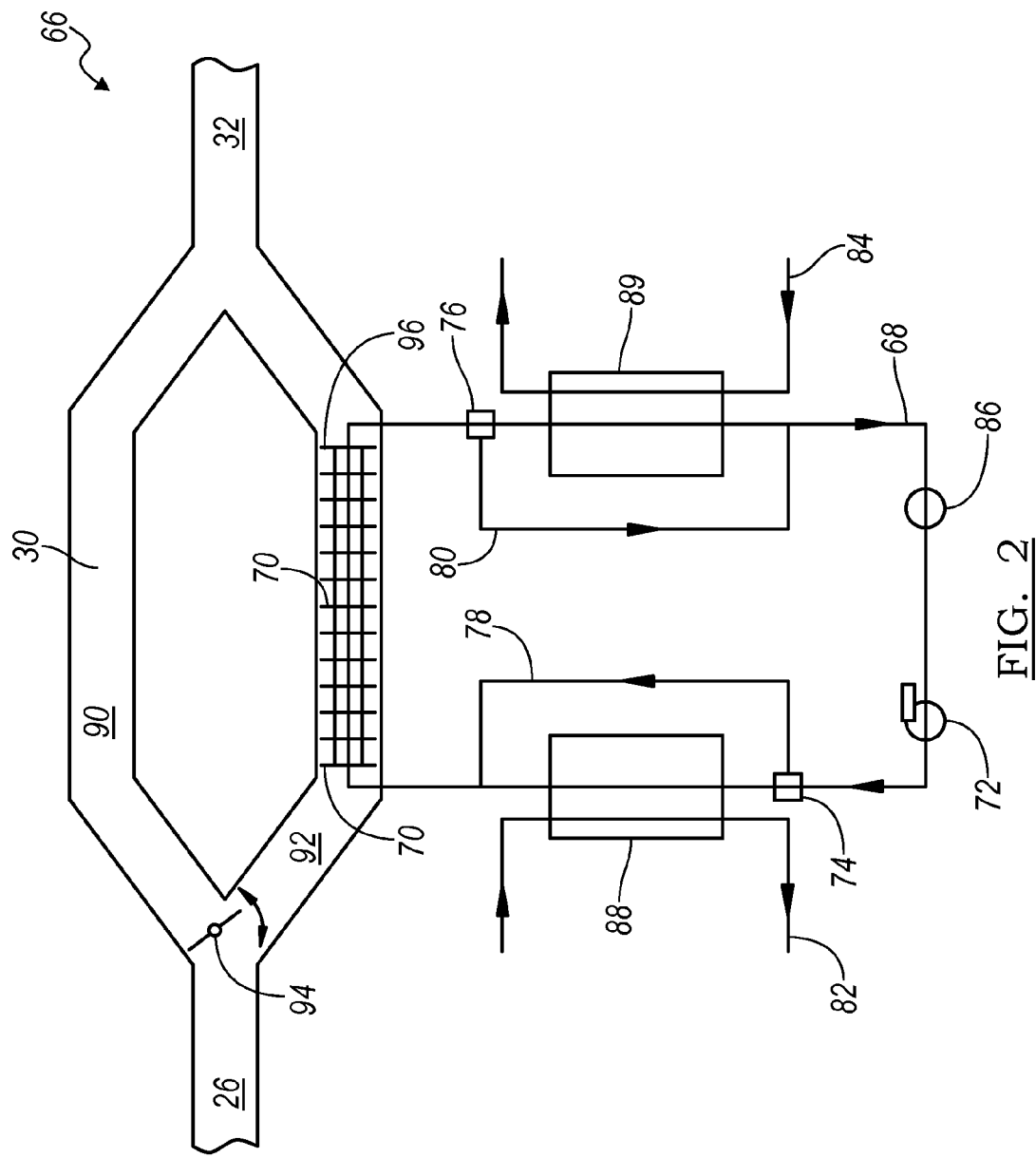
FIG. 2 illustrates a fluid heating system for heating powertrain components.

Referring to FIGS. 1 and 2, the vehicle 10 is shown. The vehicle 10 includes an internal combustion engine 12. The engine 12 produces power for propelling the vehicle 10. The engine 12 is coupled to the transmission 14. The transmission 14 includes gearing for varying the torque and speed ratios between the engine 12 and wheels 22. Torque from the engine 12 is transferred through the transmission 14 to a differential 18 by a transmission output shaft 16. Axle half shafts 20 extend from the differential 18 to a pair of driven wheels 22 to provide drive torque for propelling the vehicle 10.

The vehicle 10 includes a powertrain control module 54 for controlling various systems of the vehicle 10. The PCM 54 may include an engine control unit 56 and a transmission control unit 58. The ECU 56 receives signals from vehicle sensors and controls the engine 12. The TCU 58 receives signals from the vehicle sensors and controls the transmission 14. The vehicle controllers, including the PCM 54, ECU 56 and TCU 58, generally have any number of microprocessors, ASICs, ICs, memory (e.g. FLASH, ROM, RAM, EPROM and/or EEPROM) and software code to co-act with one another to perform a series of operations. The controllers also include predetermined data, or "look up tables" that are based on calculations and test data and stored within the memory. The controllers communicate with other vehicle systems and controllers over one or more wired or wireless connections using common bus protocols (e.g. CAN and/or LIN).

The engine 12 includes an exhaust manifold 24. The exhaust manifold 24 is coupled to an exhaust pipe 26. The exhaust pipe 26 includes at least one catalytic converter 28. An exhaust heat exchanger assembly 30 may be included on the exhaust pipe 26 in some embodiments. A tailpipe 32 may be connected to the assembly 30. During engine operation, post combustion gases are removed from the engine 12 through the exhaust manifold 24 and out the end of the tailpipe 32.

The engine 12 also includes an intake manifold (not shown). The intake manifold includes a throttle body 36. The throttle body 36 includes a butterfly. The butterfly opens and closes the throttle body 36 for controlling the amount of air entering into the intake manifold and subsequently into the combustion chamber of the engine 12. The butterfly is opened and closed according to a user input on the accelerator pedal 40. The butterfly may be connected with the accelerator pedal via a mechanical cable or may be electronically controlled. The throttle body 36 includes a throttle body position sensor 42. The throttle body position sensor 42 is in communication with the PCM 54. The throttle body positions sensor 42 produces a throttle body position signal 44 that is received by the PCM 54.

The engine 12 includes an engine temperature sensor 46 that is in communication with the PCM 54. The engine temperature sensor 46 produces an engine temperature signal 48 that is received by the PCM 54. The engine 12 also includes an engine speed sensor 50 for determining engine revolutions per minute (RPM). The RPM engine speed sensor 50 is in communication with the PCM 54. The engine speed sensor 50 produces an engine speed signal 52 that is received by the PCM 54.

The transmission 14 includes a transmission temperature sensor 60 that is in communication with the PCM 54. The transmission temperature sensor 60 produces a transmission temperature signal 61 that is received by the PCM 54. The transmission 14 also includes a transmission gear sensor 62 that is in communication with the PCM 54. The transmission gear sensor 62 produces a transmission gear signal 63 that is received by the PCM 54. The vehicle 10 may include a data bus rather than using a plurality of individual wires.

The vehicle 10 includes a selective heating system 66. The system 66 includes one or more conduits, pumps, valves and heat exchangers to selectively heat desired vehicle components depending upon vehicle operating states and conditions. For example, FIGS. 1 and 2 illustrate a selective heat heating system 66 that can selectively supply heat to the engine 12 and the transmission 14. The system 66 includes a loop 68 configured to circulate a coolant medium, such as an ethylene glycol mixture. The loop 68 is coupled to the exhaust heat exchanger assembly 30. The exhaust heat exchanger assembly 30 is the heat source for the system 66.

The exhaust heat exchanger assembly 30 may include an inlet portion that splits into a first branch 90 and a second branch 92. A valve 94 is provided in the inlet portion to direct exhaust gases into the first and/or second branches 90, 92. The first branch 90 is a free flowing branch and does not contain any additional components and is the primary exhaust branch when the heat exchanger assembly 30 is not being utilized. The second branch 92 includes a heat exchanger 96. The heat exchanger 96 includes a plurality of fins 70 for conducting heat from the exhaust gases. The heat exchanger 96 is coupled to the loop 68. The coolant in the loop 68 absorbs heat from the fins 70 as coolant is circulated through the heat exchanger 96.

The loop 68 includes a transmission heat exchanger 88. The transmission heat exchanger 88 transfers heat between the loop 68 and transmission lines 82. The transmission lines 82 circulate transmission fluid (TF) to and from the transmission. As the TF passes through the transmission heat exchanger 88, heat is transferred from the loop 68 to lines 82 to provide heat to the transmission 14. A transmission valve 74 is positioned on the loop upstream of the transmission heat exchanger 88. The valve 74 controls the flow of coolant through the heat exchanger 88. The valve 74 is open when it is desirable for heat to be transferred to the transmission and is closed when the transmission is not being heated. A bypass line 78 is provided allowing coolant to bypass the transmission heat exchanger 88 when the valve 74 is closed.

The loop 68 also includes an engine heat exchanger 89. The engine heat exchanger 89 transfers heat between the loop 68 and the engine lines 84. The engine lines 84 circulate coolant to and from the engine 12. As the coolant passes through the engine heat exchanger 89, heat is transferred from the loop 68 to the lines 84 to provide heat to the engine 12. An engine valve 76 is positioned on the loop upstream of the engine heat exchanger 89. The valve 76 controls the flow of coolant through the heat exchanger 89. The valve 76 is open when it is desirable for heat to be transferred to the engine and is closed when the engine is not being heated. A bypass line 80 is provided allowing coolant to bypass the engine heat exchanger 89 when the valve 76 is closed. The valves 74, 76 are in communication with the PCM 54 and their operation is controlled by signals sent from the PCM 54.

The coolant loop 68 also includes a pump 72 for propelling coolant through the loop 68. The pump 72 may be a pump powered by rotational movement of the crankshaft. Alternatively, the pump 72 may be energized by electricity. The coolant loop 68 may also include a loop temperature sensor 86 that is configured to provide a temperature signal to the PCM 54.

Figure 3:
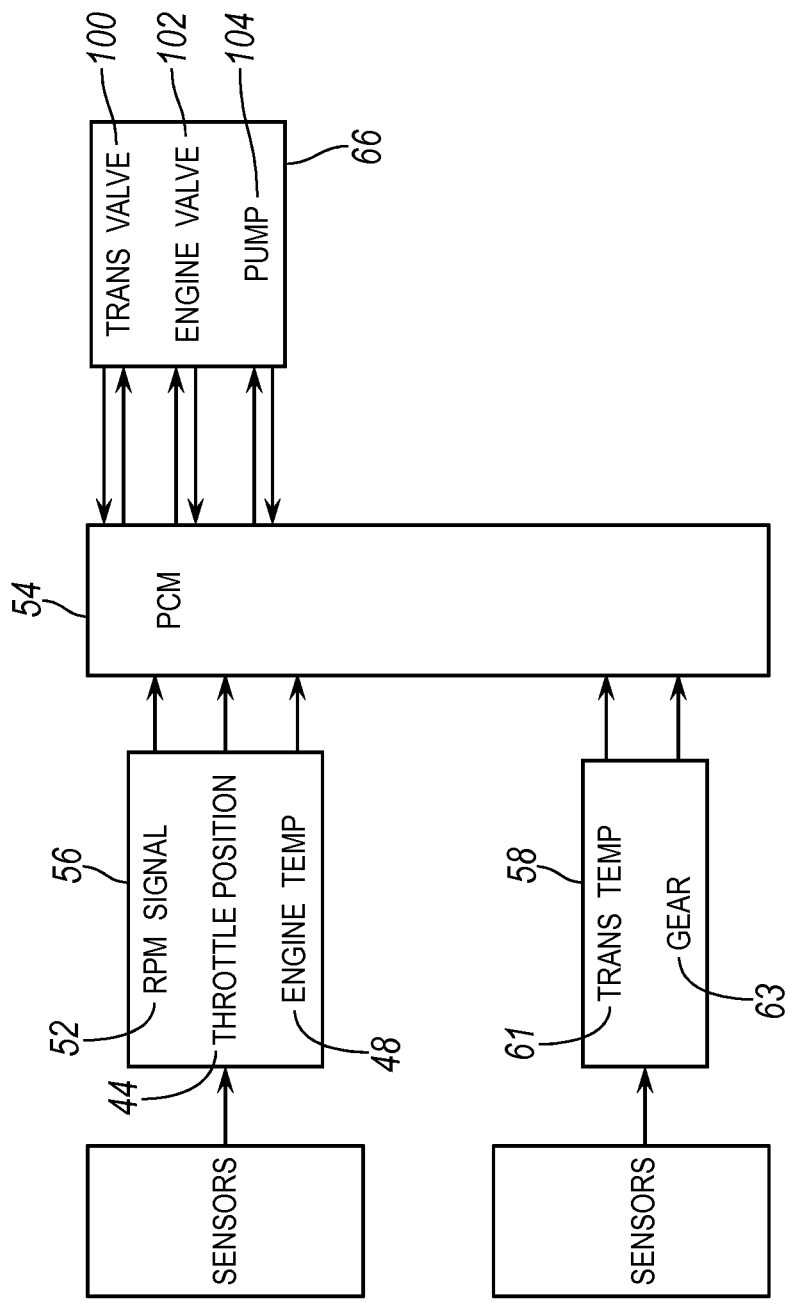
FIG. 3 illustrates an enlarged view of a portion of the vehicle system shown in FIG. 1 depicting internal vehicle communication.

Referring to FIG. 3, the PCM 54 receives input that is indicative of present operating conditions of vehicle systems and provides output to coordinate their function. Each input may be a signal transmitted directly between the PCM and the corresponding vehicle system or indirectly as data over a data bus. The ECU 56 monitors engine operating conditions and provides input indicating operating conditions of the engine 12 to the PCM 54. For example, the ECU 56 may provide an engine temperature signal 48, a throttle position signal 44, and a RPM signal 52. The TCU 58 monitors transmission 14 operating conditions and provides input indicating operating conditions of the transmission 14 to the PCM 54. For example, the TCU 58 may provide a transmission temperature signal 61 and a transmission gear signal 63. The PCM 54 analyzes the signals received from the ECU 56 and TCU 58 to determine the operating state of the vehicle 10.

The PCM 54 evaluates the inputs and provides outputs to the selective heating system 66. The PCM 54 outputs a transmission valve signal 100 to the transmission valve 74. The transmission valve signal 100 instructs the transmission valve to increase or decrease coolant flow into the transmission heat exchanger 88 depending upon operating conditions. The PCM 54 also outputs an engine valve signal 102 to the engine valve 76. The engine valve signal 102 instructs the engine valve 76 to increase or decrease coolant flow into the engine heat exchanger 89 depending upon operating conditions. The PCM 54 may output a pump signal 104 to the pump 72. The pump signal 104 controls operation the pump 72. The PCM 54 may also receive feedback signals from the selective heating system 66. The feedback signals may include valve position, pumps condition and loop temperature signals.

Figure 4:
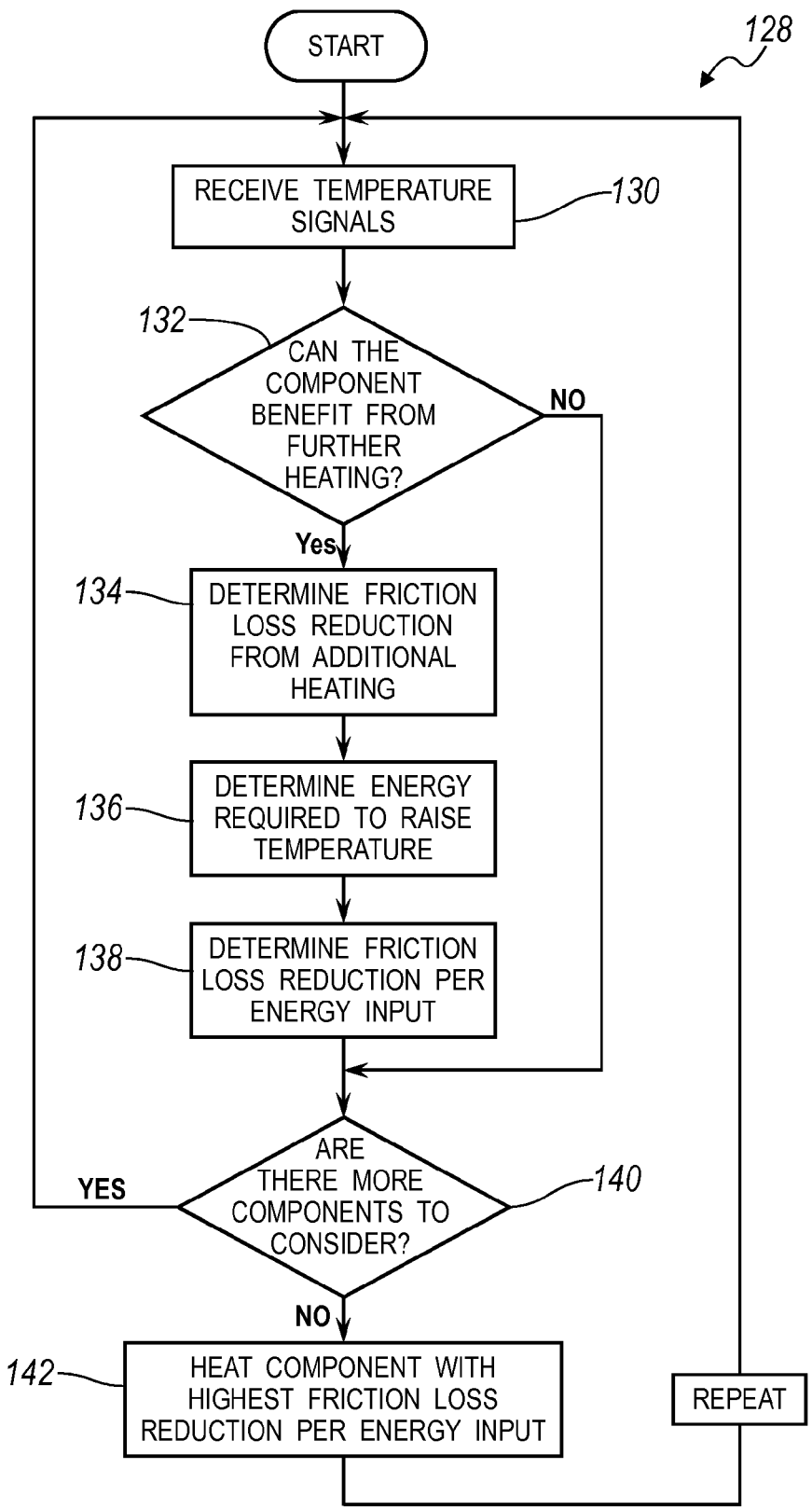
FIG. 4 is a flowchart illustrating a method for operating the selective heating system.

Referring to FIG. 4, a flowchart 128 for operating the selective heating system 66 is illustrated. The PCM 54 generally includes any number of microprocessors, ASICs, ICs, and/or memory which co-act with software code to perform the operations of the flowchart 128.

In operation 130, the PCM 54 receives signals from a selected vehicle component (e.g. engine 12, transmission 14, battery array, etc.) and determines the operating temperature of the vehicle component. For example, the PCM 54 may determine the operating temperature of the engine 12 from an input signal received from the engine temperature sensor 46. Alternatively, the engine temperature may be inferred through modeling or empirical data that is stored in the PCM.

In operation 132, the PCM 54 determines if the selected component can benefit from additional heating. For example, a component may not benefit from additional heating if the component's current temperature is within the optimal range or if the component requires cooling. For example, a fully warmed engine, transmission or battery assembly requiring cooling would not benefit from additional heating. If the engine component cannot benefit from additional heating, the PCM 54 proceeds to operation 140 and determines if there are any more vehicle components to consider. If the engine can benefit from additional heating, the PCM 54 proceeds to operation 134.

In operation 134, the PCM 54 determines the benefit opportunity for additional heating of the selected component. Friction losses of the powertrain components may be measured in watts (W). One metric that may be used to determine the benefit opportunity of additional heating is a reduction of friction losses of the component due to increased component temperature.

The PCM 54 can determine the friction losses for the selected component from one or more algorithms stored in memory. The algorithms provide a friction loss output based on a temperature input and other component operating conditions such as rotational speed, load, output torque, etc. The algorithms may be created in advance and stored in the memory. The algorithm may be based on a combination of modeling, empirical data, testing and theory.

Figure 5:
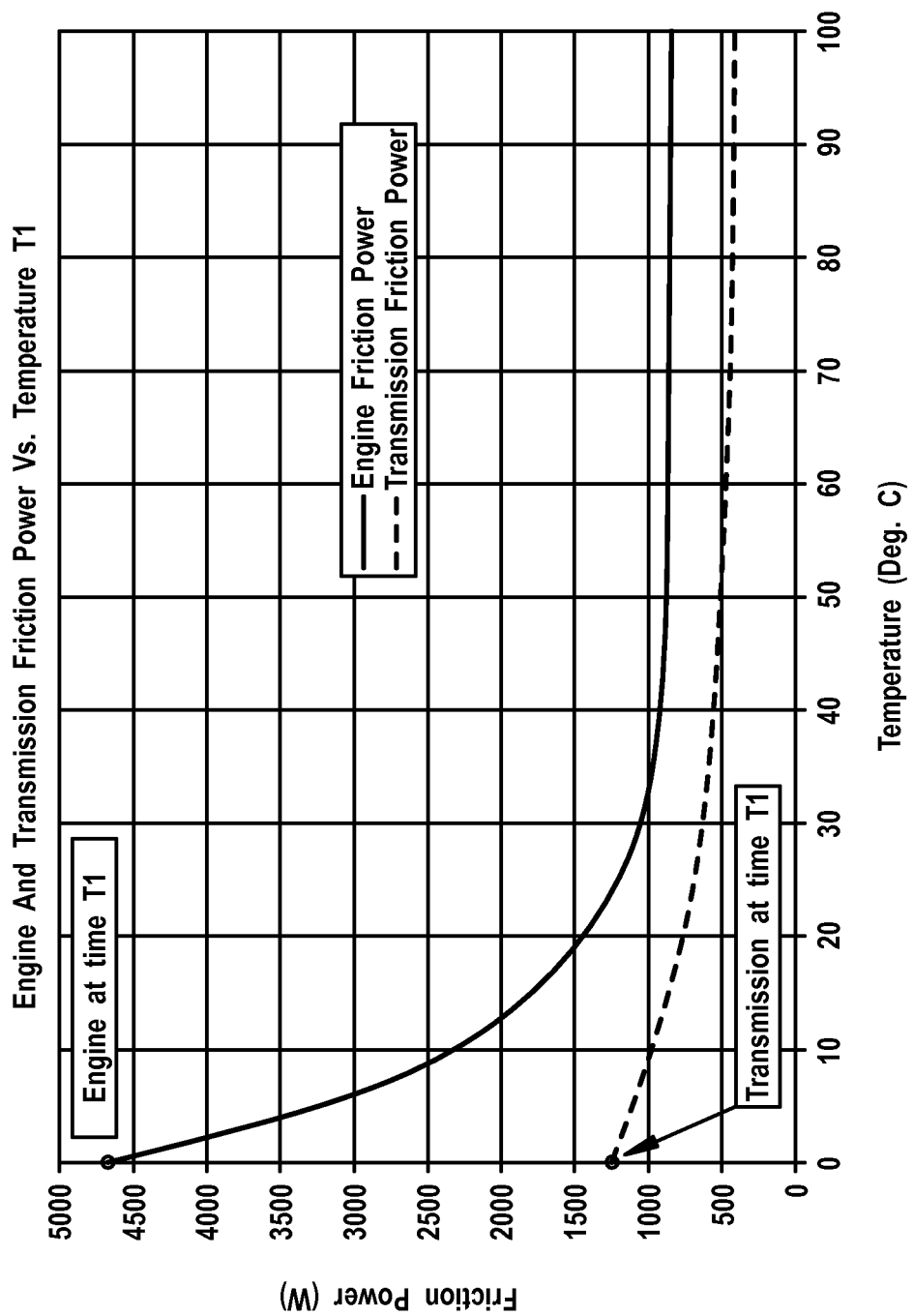
FIG. 5 is a graph illustrating hypothetical engine and transmission friction losses verses temperature of the components.

For example, FIG. 5 shows a plot for hypothetical engine and transmission friction losses verses temperature of the components for a particular set of operating conditions. At time T1, the engine has a temperature of 0° C. which corresponds to 4673 watts of friction losses at the particular operating conditions of the engine. The slope of the engine line at T1 is −293 W/deg. C. Therefore, raising the temperature of the engine 1° C. will reduce engine friction power by 293 W. Thus, in the above example, the delta loss is 293 W.

In operation 136, the PCM 54 determines the amount of energy required to raise the temperature of the selected component. Delta temperature per energy input may be determined using thermal mass calculations and models. The thermal mass of the various vehicle components can be calculated and stored in memory. Thermal mass has units of kilojoules per degrees Celsius (kJ/C). If the thermal mass is known, the PCM can determine how many kilojoules of energy are required to raise the temperature of the selected component. Referring back to the engine example, the engine has a thermal mass of 60 kJ/C. Therefore, the selective heating system 66 would have to supply 60 kJ of energy to the engine to raise the engine temperature by 1° C. and reduce the friction losses by 293 W.

In operation 138, friction loss reduction per energy input is calculated for the selected component. The friction loss reduction per energy input may be calculated using equation 1, which multiplies the output of operation 134 with the output of operation 136. The delta temperature values cancel and a delta loss per energy input value is determined for the selected component.

$$\frac{\text{delta loss}}{\text{delta temperature}} * \frac{\text{delta temperature}}{\text{energy input}} = \frac{\text{delta loss}}{\text{energy input}}. \quad \text{Eq 1}$$

Referring back to the engine example shown in FIG. 5, at Time T1 the friction reduction v. energy input for the engine is 4.88 W/kJ. (293 W/C×1C/60 kJ=4.88 W/kJ)

In operation 140, the PCM 54 determines if there are any other vehicle components to consider. If there are, the PCM 54 calculates the friction loss reduction per energy input for those other component as described above. For example, the next component may be the transmission. At operation 130 the PCM 54 determines the transmission temperature.

At operation 132 the PCM 54 determines if the transmission can benefit from further heating. If the transmission can benefit from further heating the controller proceeds to operation 134. If the transmission cannot benefit from further heating the controller proceeds to operation 140.

At operation 134, PCM 54 determines the delta loss opportunity from heating. Again referring to the example shown in FIG. 5, at time T1, the transmission has a temperature of 0° C. which corresponds to 1257 watts of friction losses at the particular operating conditions of the transmission. The slope of the transmission line at T1 is −35 W/degrees C. Therefore, raising the temperature of the transmission 1° C. will reduce transmission friction by 35 W. Thus, in the above example, the delta loss is 35 W. At operation 136, the PCM 54 determines the amount of energy required to raise the temperature of the selected component. The thermal mass of the transmission is 30 kJ/C. Therefore, the selective heating system 66 has to supply 30 kJ of energy to the transmission to raise the transmission temperature by 1° C. and reduce the friction losses by 35 W. At operation 138, the benefit v. heating input is computed for the transmission. Using equation 1, the friction loss reduction per energy input for the transmission is 1.17 W/kJ.

The calculations would then be again repeated for as many components as desired. Once a benefit v. energy input is calculated for all components the PCM 54 proceeds to operation 142. In operation 142, the PCM 54 compares the benefit v. energy input values for all components considered and selects the component with the highest benefit v. energy input value. The PCM 54 then instructs the selective heating system 66 to heat the selected component. Referring back to the engine-transmission example, the PCM 54 at operation 142 compares the engine value of 4.88 W/kJ to the transmission value of 1.17 W/kJ and selects the engine for heating because it provides the largest reduction in friction losses per unit heating of energy input. The PCM 54 recalculates the friction loss reduction per energy input for the components at selected time intervals. For example, the PCM 54 may recalculate every second, every 10 seconds or every minute. The flowchart illustrates the PCM 54 as computing each component one at a time; however, the PCM 54 may calculate each component simultaneously. The PCM 54 may include additional considerations when calculating which component to heat. For example, PCM 54 may apply penalty functions to various components to account for heating difficulties.

The selective heating system may also be configured to heat multiple components simultaneously and may use the different values of benefit verses heat input ratio of the various components calculated as described previously to apportion the heat available to the various components. In the example previously described, the engine has a benefit to heating value of 4.88 W/kJ compared to the transmission's 1.17 W/kJ. Here, heating the engine provides 4.17 (4.88/ 1.17) times the benefit for heat input as compared to the transmission. The PCM 54 may operate the selective heating system 66 to provide 4.17 times more heat to the engine than the transmission. The heat split may be accomplished through operation of the valves 74 and 76 and pump 72 to provide the desired heating split.

The vehicle may operate at a condition in which no components can benefit from further heating. An example condition is a hot operating condition where the vehicle components are within the optimal range and/or if the components require cooling. Here, the selective heating system may be deactivated until the system identifies a component that would benefit from heating. The system may continue to monitor the components during the hot operating condition state.

In the FIG. 5 example, the component with the steepest friction loss slope was selected for heating. However, that will not always be the case. The waste heat supplied by the engine has a finite amount of thermal energy that can be extracted and applied to the components. Because the available thermal energy is finite, only calculating the friction losses is not sufficient for choosing which component to heat. Different components require more or less energy to raise their temperature. For example, 100 J of thermal energy will increase component "A" by 1° C. but will increase component "B" by 5° C. Because of this, it may be better to heat component "B" over component "A" even though component "A" has a stepper friction loss slope.

Using the exhaust heat of an engine is only one embodiment of the current application. The heat source may be a thermal storage device, such as a heat battery, a heat thermos or any other component that is hotter than some group of other components. The thermal energy from the heat source may be transferred from the heat source to the selected components by heat exchangers or by other means.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a powertrain having a plurality of components, including an engine; and
   a controller programmed to:
      calculate a quotient value for each component derived from a calculated temperature-dependent friction loss for the component and a thermal mass of the component received from a lookup table
      identify one of the plurality of components as having the greatest quotient value, and
      heat the one of the plurality of components with waste heat from the engine.

2. The vehicle of claim 1 further comprising a thermal system configured to supply the waste heat to at least one of the plurality of components.

3. The vehicle of claim 2 wherein the thermal system is a fluid loop.

4. The vehicle of claim 1 wherein the plurality of components further includes a transmission.

5. A method for controlling a selective heating system comprising:
   calculating a value of friction-power loss per energy input for each of a plurality of components in a powertrain, wherein the value is derived from a calculated temperature-dependent friction loss for the component and a thermal mass of the component received from a lookup table;
   identifying one of the plurality of components of the powertrain as having a greatest value of friction-power loss per energy input; and
   heating the one of the plurality of components.

6. The method of claim 5 further comprising the steps of:
   sending a signal to a thermal system instructing the thermal system to selectively heat the one of the plurality of components.

7. The method of claim 5 further comprising heating another of the plurality of components based on the value of friction-power loss per energy input of the another of the plurality of components.

8. A vehicle control system comprising:
   at least one controller programmed to:
      calculate a quotient value for each of a plurality of components of a powertrain derived from a calculated temperature-dependent friction loss for the component and a thermal mass for the component received from a lookup table,
      identify one of the plurality of components as having the greatest quotient value, and
      heat the one of the plurality of components with waste heat from an engine.

9. The vehicle control system of claim 8 further comprising a thermal system configured to supply the waste heat to the one of the plurality of components.

10. The vehicle control system of claim 9 wherein the thermal system is a fluid loop.

11. The vehicle control system of claim 8 wherein the plurality of components includes an engine and a transmission.

12. The vehicle control system of claim 8 wherein the waste heat is captured from an exhaust of the engine.

* * * * *

UNITED STATES PATENT AND TRADEMARK OFFICE
CERTIFICATE OF CORRECTION

PATENT NO. : 9,759,114 B2
APPLICATION NO. : 14/306345
DATED : September 12, 2017
INVENTOR(S) : William Samuel Schwartz et al.

It is certified that error appears in the above-identified patent and that said Letters Patent is hereby corrected as shown below:

In the Claims

Column 8, Line 2, Claim 1:
After "from a lookup table"
Insert -- , --.

Signed and Sealed this
Fifth Day of December, 2017

Joseph Matal
*Performing the Functions and Duties of the*
*Under Secretary of Commerce for Intellectual Property and*
*Director of the United States Patent and Trademark Office*